(12) United States Patent
Enevoldsen et al.

(10) Patent No.: US 10,823,153 B2
(45) Date of Patent: Nov. 3, 2020

(54) WIND TURBINE BLADE HAVING A COVER PLATE MASKING HOT-AIR EXHAUST FOR DE-ICING AND/OR ANTI-ICING

(71) Applicant: Siemens Gamesa Renewable Energy A/S, Brande (DK)

(72) Inventors: Peder Bay Enevoldsen, Vejle (DK); Lennart Froelund, Aarhus C (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 92 days.

(21) Appl. No.: 16/127,945

(22) Filed: Sep. 11, 2018

(65) Prior Publication Data

US 2019/0078558 A1  Mar. 14, 2019

(30) Foreign Application Priority Data

Sep. 14, 2017 (EP) .................................... 17191069

(51) Int. Cl.
*F03D 80/40* (2016.01)
*F03D 1/06* (2006.01)

(52) U.S. Cl.
CPC ........... *F03D 80/40* (2016.05); *F03D 1/0675* (2013.01); *F05B 2220/30* (2013.01);
(Continued)

(58) Field of Classification Search
None
See application file for complete search history.

(56) References Cited

U.S. PATENT DOCUMENTS 7,217,091 B2   5/2007   LeMieux
7,637,715 B2   12/2009  Battisti
(Continued)

FOREIGN PATENT DOCUMENTS

CN   102562487 A   7/2012
CN   104160147 A   11/2014
(Continued)

OTHER PUBLICATIONS

Extended European Search Report dated Apr. 4, 2018 for Application No. 17191069.8.
(Continued)

*Primary Examiner* — Michael Lebentritt
(74) *Attorney, Agent, or Firm* — Schmeiser, Olsen & Watts LLP (57) ABSTRACT

A rotor blade uses hot-air, for example exhaust from a generator positioned inside a nacelle of a wind turbine, for de-icing and/or anti-icing. The rotor blade has an airfoil section and a cavity enclosed therein. A flow path inside the cavity, for flow of the hot-air, extends from a root section towards a tip section. Exhaust holes, fluidly connected with the flow path, at an outer surface of the airfoil section emit the hot-air from the airfoil section. The rotor blade includes a cover plate positioned at the outer surface of the airfoil section and masking the exhaust holes, thereby creating an external flow space between the exhaust holes and the cover plate's inner surface. The cover plate guides the hot-air over the outer surface of the airfoil section after the hot-air exits, via the exhaust holes, the airfoil section and before the hot-air escapes the rotor blade.

19 Claims, 6 Drawing Sheets

(52) U.S. Cl.
CPC . *F05B 2220/7066* (2013.01); *F05B 2240/221* (2013.01); *F05B 2240/30* (2013.01); *F05B 2250/183* (2013.01); *F05B 2260/20* (2013.01); *F05B 2280/2001* (2013.01); *F05B 2280/4007* (2013.01); *F05B 2280/5002* (2013.01); *F05B 2280/6013* (2013.01)

(56) References Cited

U.S. PATENT DOCUMENTS

| | | | | |
|---|---|---|---|---|
| 8,047,784 B2* | 11/2011 | Bonnet | ............... | F03D 1/0675 416/1 |
| 8,678,765 B2* | 3/2014 | Bendel | ............... | F03D 1/0675 29/463 |
| 8,864,457 B2* | 10/2014 | Malandra | ............ | F01D 5/141 415/191 |
| 8,888,454 B2* | 11/2014 | Hansen | ............... | F03D 80/30 416/39 |
| 8,944,773 B2* | 2/2015 | Weisse | ................ | F01D 5/147 416/229 R |
| 9,046,078 B2* | 6/2015 | Miller | .................. | F03D 1/06 |
| 9,085,989 B2* | 7/2015 | Shah | .................... | F01D 5/20 |
| 9,574,282 B2* | 2/2017 | Parkos | ............... | F04D 29/023 |
| 9,797,267 B2* | 10/2017 | Lohaus | ............... | F01D 5/141 |
| 10,118,696 B1* | 11/2018 | Hoffberg | ............. | B64C 39/001 |
| 10,190,418 B2* | 1/2019 | Kwon | ................. | F01D 5/18 |
| 10,202,852 B2* | 2/2019 | Jaiswal | ............... | F01D 5/186 |
| 10,221,692 B2* | 3/2019 | Cojande | .............. | F01D 5/141 |
| 10,337,521 B2* | 7/2019 | Roche | ............... | F04D 29/388 |
| 10,393,090 B2* | 8/2019 | Bae | ..................... | F03D 1/0641 |
| 10,408,065 B2* | 9/2019 | Rathay | ................. | F01D 5/20 |
| 10,443,613 B2* | 10/2019 | Malmborg | ........... | F04D 29/388 |
| 10,464,680 B2* | 11/2019 | Kinlen | ............... | B64D 15/12 |
| 10,514,022 B2* | 12/2019 | Kimura | ............... | B32B 5/26 |
| 2005/0242233 A1* | 11/2005 | Battisti | ............... | F03D 80/40 244/58 |
| 2010/0034652 A1* | 2/2010 | Battisti | ............... | F03D 7/042 416/39 |
| 2012/0107133 A1* | 5/2012 | Bulin | ................. | B64C 11/48 416/96 R |
| 2012/0141271 A1* | 6/2012 | Southwick | ............ | F03D 1/0633 416/23 |
| 2013/0043342 A1* | 2/2013 | Nordin | ................ | B64C 3/20 244/1 A |
| 2013/0106108 A1* | 5/2013 | De Boer | ............... | F03D 7/045 290/44 |
| 2013/0136598 A1* | 5/2013 | Loewe | ................ | B29C 70/443 416/95 |
| 2014/0356187 A1* | 12/2014 | Wong | .................. | F03D 80/40 416/96 R |
| 2014/0369851 A1* | 12/2014 | Lim | ..................... | B29C 59/022 416/241 R |
| 2015/0056074 A1 | 2/2015 | Veldkamp et al. | | |
| 2015/0125297 A1 | 5/2015 | Bahuguni et al. | | |
| 2016/0003223 A1 | 1/2016 | Barth | | |
| 2016/0040654 A1 | 2/2016 | Cuoghi et al. | | |
| 2017/0254316 A1 | 9/2017 | Philipsen et al. | | |
| 2017/0334577 A1* | 11/2017 | Andrzejewski | ....... | B64C 11/205 |
| 2018/0112649 A1* | 4/2018 | Shain | ................. | F03D 80/30 |
| 2018/0187561 A1* | 7/2018 | Zhao | .................. | B64C 11/205 |
| 2019/0084682 A1* | 3/2019 | Aubert | ................ | B64D 15/12 |
| 2019/0153994 A1* | 5/2019 | Tobin | ................ | B29C 70/00 |

FOREIGN PATENT DOCUMENTS

| | | |
|---|---|---|
| CN | 104169576 A | 11/2014 |
| CN | 104995403 A | 10/2015 |
| CN | 107110127 A | 8/2017 |
| DE | 102008048617 A1 | 4/2010 |
| EP | 1788239 A2 | 5/2007 |
| EP | 2801721 A2 | 11/2014 |
| WO | WO 2007138452 A2 | 12/2007 |

OTHER PUBLICATIONS

Canadian Search Report for Application No. 3,017,204, dated May 23, 2019.

Office Action in related Chinese Patent Application No. 201811073548. 3, dated Nov. 25, 2019. 6 pages.

* cited by examiner

WIND TURBINE BLADE HAVING A COVER PLATE MASKING HOT-AIR EXHAUST FOR DE-ICING AND/OR ANTI-ICING

CROSS-REFERENCE TO RELATED APPLICATIONS

This application claims priority to European application No. EP17191069 having a filing date of Sep. 14, 2017, the entire contents of which are hereby incorporated by reference.

FIELD OF TECHNOLOGY

The following relates generally to wind turbines, and in particular, to a wind turbine rotor blade having hot-air exhaust at an outer surface of the rotor blade. Furthermore, embodiments of the invention relate to a wind turbine comprising such a rotor blade.

BACKGROUND

Wind turbines are installed at locations with varied weather conditions. When installed at cold locations, icing on any exposed part of a wind turbine, especially on a rotor blade of the wind turbine, can occur and cause decreased performance of the wind turbine resulting into production losses. Furthermore when ice accumulates on one or more of the rotor blades of a wind turbine, excess vibration problems from uneven blade icing may occur. The accumulated ice may generate excessive mechanical loads on the wind turbine rotor blade posing problems to structural integrity of the rotor blade and leading eventually to wind turbine shut-down or to wind turbine faults.

Problems related to icing of rotor blades of wind turbines can be prevented by at least one of two different measures: a first measure is de-icing in which accumulated or accreted ice from the rotor blade is removed, and the other measure is anti-icing in which accretion or accumulation of ice on the rotor blade is avoided or obviated.

Several approaches exist in the art of wind turbines for de-icing and/or anti-icing. One such approach is by using hot-air inside a cavity of the rotor blade.

U.S. Pat. No. 7,217,091 discloses a method for deicing a turbine rotor blade having a blade root, a blade tip, and a leading edge, wherein the turbine rotor blade is coupled to a hub of a turbine. The method includes circulating heated air through an outflow channel from the blade root towards the blade tip, re-circulating the heated air via a return channel from the blade tip to the blade root, whereupon the re-circulated heated air becomes returned air, and reheating the returned air for further circulation. The requirement of re-circulating the heated air back to the blade root requires complex designing which may be difficult due to space constraint within the rotor blade and particularly within the blade root. Furthermore the wind turbine using such technique for deicing requires a mechanism, for example air fans, etc, to enable the re-circulation of the heated air from the blade tip to blade root.

U.S. Pat. No. 7,637,715 discloses an anti-icing system for wind turbines. In the disclosed system, a WECS (Wind Energy Converting System i.e. a wind turbine) comprises a tower, a rotor having a plurality of blades that rotate due to wind force, a nacelle including a first means for transforming the rotor's rotational movement to electric power, and a second means for permitting the flow of fluid from volumes defined by the rotor blades. The rotor blades include an external surface having openings in fluid connection with the volumes inside the blades for permitting the flow of fluid to the outside of the blades to fluid-thermodynamically interact with the wind hitting the part of the blade surface, and thereby prevent or eliminate the accretion of ice on the external surface of the blade. U.S. Pat. No. 7,637,715 also mentions that moreover such a system, in order to increase the enthalpy content of the fluid air outflowing, exploits the same heat coming from the electrical devices present in the generator, that necessarily dissipate during their operation. Thus, in U.S. Pat. No. 7,637,715, unlike the aforementioned U.S. Pat. No. 7,217,091, the heated fluid or air is not required to be re-circulated back from the volumes inside the blade towards the blade root or to the nacelle or the hub of the wind turbine. However, due to presence of such openings on the external surface of the rotor blade the aerodynamic profile of the rotor blade is disturbed resulting in noise and increased drag impact on the rotor blade. Furthermore, the fluid outflowing may flow out arbitrarily in any direction over the surface, for example not flowing in contact with the surface as soon as exiting the openings, and this may result in failure to obtain the desired heating of parts of the surface and decreased de-icing and/or anti-icing effect.

Therefore there exists a need for a technique for guiding or directing the airflow in such rotor blades with openings on the surface for expelling hot-air and thus enabling achievement of heating of desired parts of the surface and consequently efficient de-icing and/or anti-icing effect. There is also a need to reduce noise and drag effect on the rotor blade resulting from presence of such openings on the external surface of the rotor blade.

SUMMARY

An aspect relates to providing a technique for guiding or directing, as desired, the hot-air in such rotor blades with openings on the surface and thus enabling efficient de-icing and/or anti-icing effect. A further aspect elates to reducing noise and drag effect on the rotor blade resulting from presence of such openings on the external surface of the rotor blade.

In a first aspect of the present technique a rotor blade for a wind turbine is presented. In the rotor blade for purpose of de-icing and/or anti-icing hot-air is used, for example hot-air having exhaust heat from a generator positioned inside a nacelle of the wind turbine. The rotor blade has a root section and an airfoil section. The airfoil section encloses therewithin a cavity. The airfoil section includes a leading edge section including a leading edge, a trailing edge section including a trailing edge, a pressure side, a suction side, and a tip section including a tip. The rotor blade has a flow path for the hot-air. The flow path at least partially extends within the cavity of the airfoil section. The flow path extends from the root section towards the tip section of the airfoil section. The flow path is configured to receive the hot-air, for example the hot-air coming from the generator exhaust inside the nacelle. In the rotor blade, one or more exhaust holes are located at an outer surface of the airfoil section. The one or more exhaust holes, hereinafter also referred to as the holes, are fluidly connected to the flow path for the hot-air, i.e. fluid in form of hot-air can flow from the flow-path inside the airfoil section to an outside of the airfoil section via the holes. The holes are configured to emit, i.e. to allow, the hot-air to exit the airfoil section i.e. the hot-air can flow to the outside of the airfoil section via the holes.

The rotor blade of the present technique further includes a cover plate positioned at the outer surface of the airfoil section. The cover plate may be formed of or fabricated from a suitable material for wind turbine applications for example, but not limited to, from thermoformed plastic and/or glassfibre material. The cover plate masks or covers the holes i.e. at least a part of the cover plate hovers over or is suspended over the outer surface of the airfoil such that a region of the outer surface having the holes is superimposed by the part of the cover plate. It may be noted that the cover plate does not close or block or blind the holes, and instead the cover plate is positioned such that an external flow space is created between the holes and an inner surface of the cover plate. As a result of the cover plate the hot-air exiting the holes cannot flow or eject arbitrarily but instead the hot-air after exiting the airfoil section is directed by the cover plate towards an outside of the rotor blade. The cover plate, particularly the inner surface of the cover plate, functions to guide the hot-air, preferably over the outer surface of the airfoil section after the hot-air exits the airfoil section but before the hot-air escapes the rotor blade. In other words, the cover plate ensures that the hot-air exiting the airfoil section, before leaving the rotor blade, spreads over or flows over a desired part of the airfoil's outer surface in the vicinity of the holes.

Since a part of the cover plate, for example one or more edges of the cover plate, is attached to the outer surface, whereas other part of the cover plate, for example a section of the cover plate between the edges, is hovering over the holes and the adjoining outer surface a partially enclosed volume i.e. the external flow space is created. The partially enclosed volume, i.e. the external flow space, may be enclosed by the attached part of the cover plate in such a way that the external flow space is blocked in one or more directions whereas the external flow space is free or open in one or more other directions, thereby dictating a path for flow of the hot-air after the hot-air exits the airfoil section and before the hot-air leaves the rotor blade. The cover plate may be attached to outer surface by adhering or gluing or sticking at least a part, i.e. the attached part of the cover plate, to the outer surface of the airfoil section, for example by using an adhesive or glue.

Thus in such rotor blades having the holes or openings on the outer surface for expelling the hot-air, after the hot-air exits the airfoil section and before the hot-air leaves the rotor blade, the cover plate guides or directs the flow of the hot-air to one or more desired regions or parts of the outer surface of the airfoil section, consequently achieving heating of the desired parts or regions of the outer surface and thereby enabling efficient de-icing and/or anti-icing effect.

In an embodiment of the rotor blade, the holes and the cover plate masking the holes are located at the trailing edge section. Alternatively in another embodiment of the rotor blade, the holes and the cover plate masking the holes are located at the leading edge section. In yet another embodiment of the rotor blade, the holes, i.e. a first set of the holes, and the cover plate, i.e. a first cover plate, masking the holes are located at the trailing edge section, whereas the holes, i.e. a second set of the holes, and the cover plate, i.e. a second cover plate, masking the holes are located at the leading edge section.

In another embodiment of the rotor blade, the holes and the cover plate masking the holes are located at the pressure side of the airfoil section. Alternatively in another embodiment of the rotor blade, the holes and the cover plate masking the holes are located at the suction side of the airfoil section. In yet another embodiment of the rotor blade, the holes, i.e. a first set of the holes, and the cover plate, i.e. a first cover plate, masking the holes are located at the pressure side of the airfoil section, whereas the holes, i.e. a second set of the holes, and the cover plate, i.e. a second cover plate, masking the holes are located at the suction side of the airfoil section.

In another embodiment of the rotor blade, the holes and the cover plate masking the holes are located at the tip section. The tip section includes the tip of the airfoil section.

In another embodiment of the rotor blade, an outer surface of the cover plate is aerodynamically shaped i.e. the outer surface of the cover plate is shaped or contoured or formed according to a contour of a part of the outer surface of the airfoil section on which or over which or at which the cover plate is positioned, thereby the aerodynamic shape of the rotor blade is maintained. This results in reduction of noise and in reduction of drag on the rotor blade.

In another embodiment of the rotor blade, the inner surface of the cover plate is profiled to define a plurality of distinct flow paths within the external flow space and wherein at least one of the distinct flow paths guides the hot-air exiting one of the one or more exhaust holes towards the outside of the rotor blade. In other words, one such distinct flow path corresponds to one of the holes, and thus directs or guides the flow of hot-air exiting that hole.

In another embodiment of the rotor blade, the cover plate is configured to direct the hot-air substantially chord-wise and/or substantially span-wise towards the outside of the rotor blade.

In another embodiment of the rotor blade, the cover plate includes serrations at an edge of the cover plate positioned towards the trailing edge of the airfoil section. The serrations may be formed as one-part with the rest of the cover plate or may be formed separately and then affixed to the cover plate.

In a second aspect of the present technique, a wind turbine is presented. The wind turbine has a nacelle connected to a hub, a heat generating device, for example a generator, housed within the nacelle, one or more rotor blades connected to the hub, wherein the rotor blades are according to the aforementioned first aspect of the present technique, and a main flow path defined within the nacelle and the hub. The main flow path is fluidly connected to the flow path of the airfoil section such that hot-air having heat generated from the heat generating device, for example exhaust heat from the generator, is directed from the nacelle via the main flow path into the flow path of the airfoil section. The wind turbine has same advantages as described hereinabove for the aforementioned first aspect of the present technique.

BRIEF DESCRIPTION

Some of the embodiments will be described in detail, with reference to the following figures, wherein like designations denote like members, wherein.

DETAILED DESCRIPTION

Hereinafter, above-mentioned and other features of the present technique are described in details. Various embodiments are described with reference to the drawing, wherein like reference numerals are used to refer to like elements throughout. In the following description, for the purpose of explanation, numerous specific details are set forth in order to provide a thorough understanding of one or more embodiments. It may be noted that the illustrated embodiments are intended to explain, and not to limit embodiments of the invention. It may be evident that such embodiments may be practiced without these specific details.

It may be noted that in the present disclosure, the terms "first", "second", "third" etc. are used herein only to facilitate discussion, and carry no particular temporal or chronological significance unless otherwise indicated.

Figure 1:
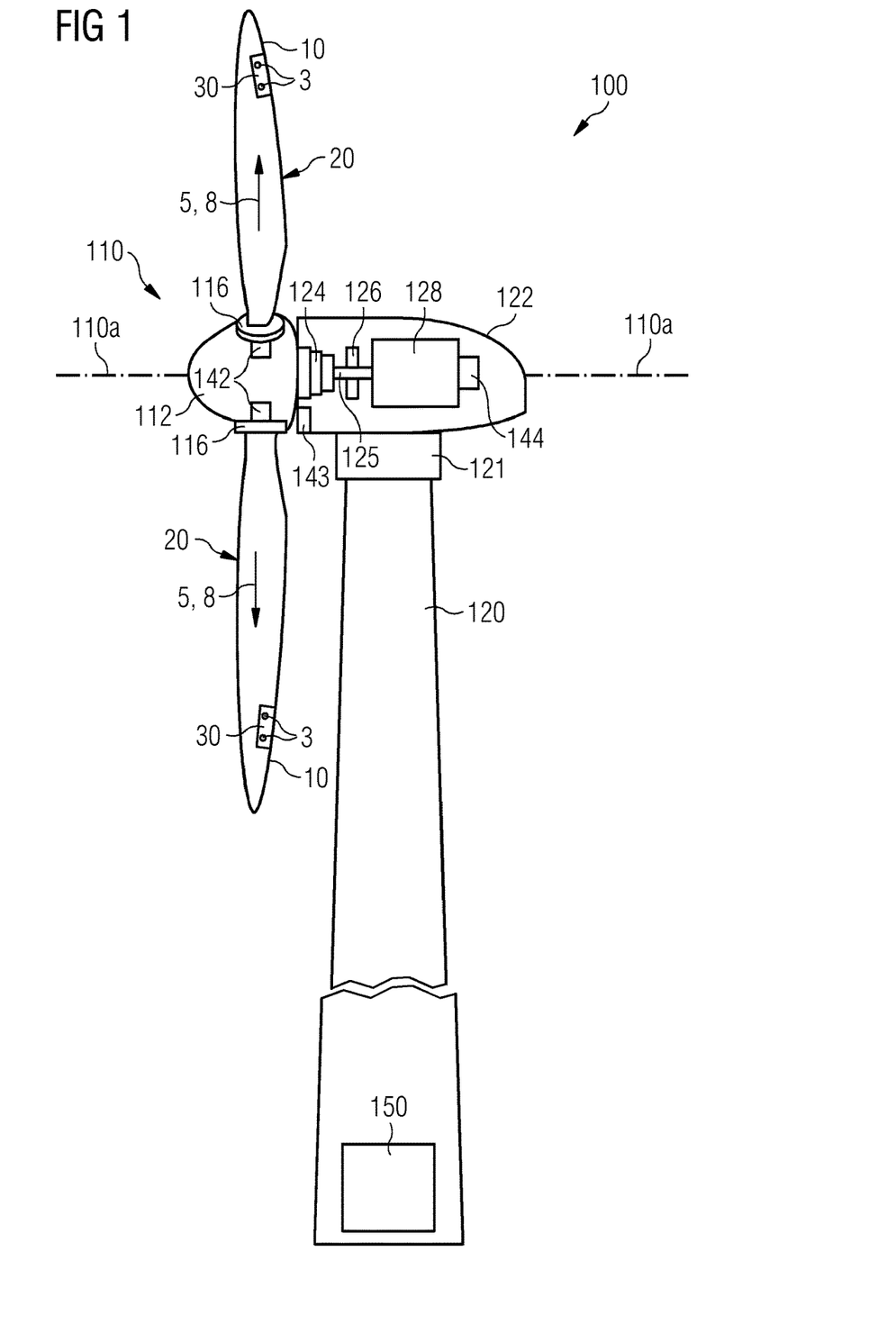
FIG. 1 shows an exemplary embodiment of a wind turbine.
Figure 2:
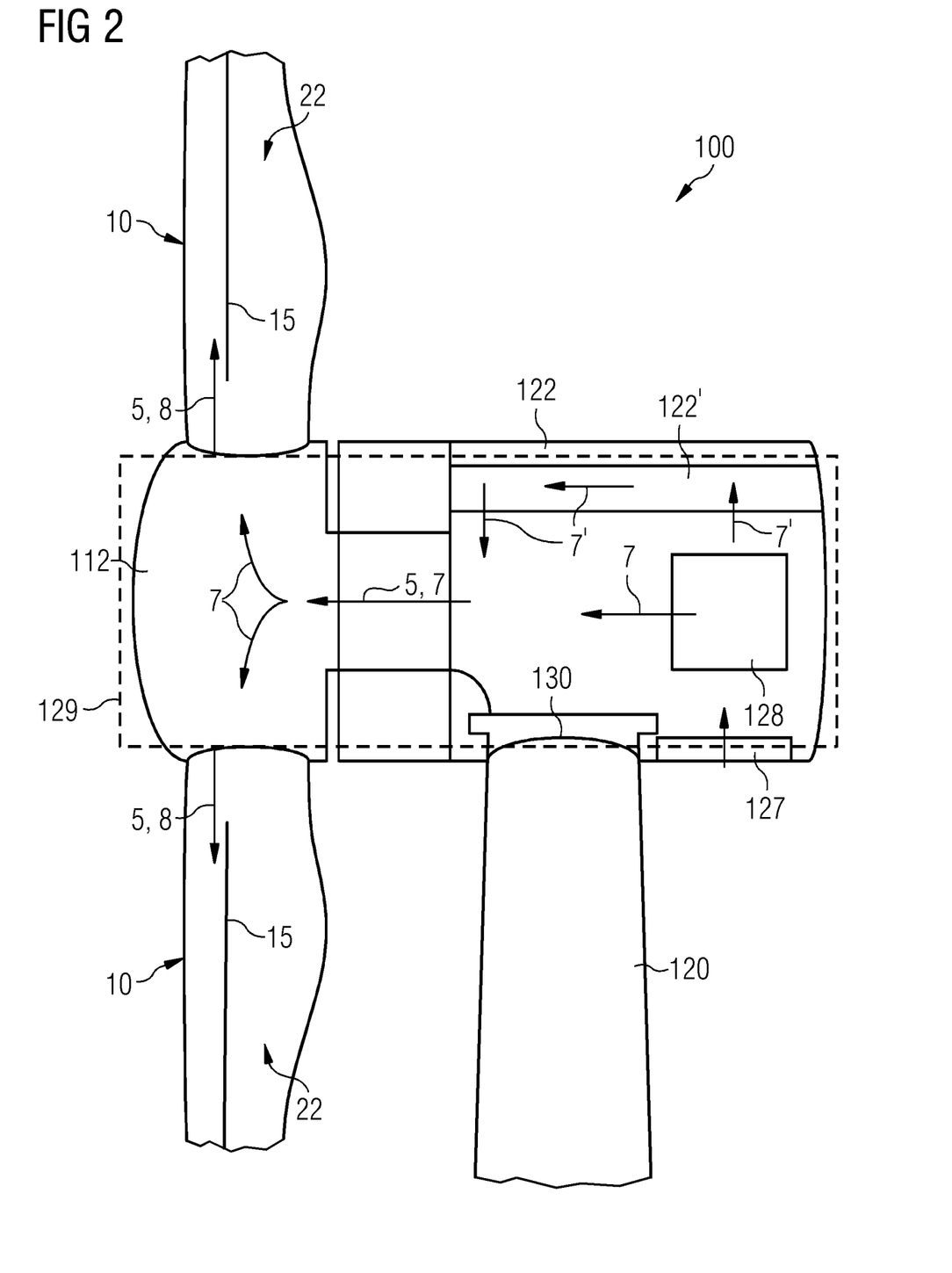
FIG. 2 schematically illustrates a flow of hot-air in a part of the exemplary embodiment of the wind turbine of FIG. 1.

FIG. 1 shows an exemplary embodiment of a wind turbine 100 of the present technique. The wind turbine 100 uses hot-air for de-icing and/or for anti-icing. FIG. 2, in combination with FIG. 1 shows a flow of hot-air within parts of the wind turbine 100. The wind turbine 100 includes a tower 120, which is mounted on a fundament (not shown). A nacelle 122 is mounted on top of the tower 120 and rotatable with regard to the tower 120 by means of a yaw angle adjustment mechanism 123 such as yaw bearings and yaw motors. The yaw angle adjustment mechanism 123 functions to rotate the nacelle 122 around a vertical axis (not shown) referred to as a yaw axis, which is aligned with the longitudinal extension of the tower 120. The yaw angle adjustment mechanism 123 rotates the nacelle 122 during operation of the wind turbine 100 to ensure that the nacelle 122 is appropriately aligned with the current wind direction to which the wind turbine 100 is subjected.

The wind turbine 100 further includes a rotor 110 having at least a rotor blade 10, and generally three rotor blades 10. In the perspective of FIG. 1 only two rotor blades 10 are visible. The rotor 110 is rotatable around a rotational axis 110a. The rotor blades 10, hereinafter also referred to as the blades 10 or as the blade 10 when referring to one of the blades 10, are generally mounted at a driving collar 112, also referred to as a hub 112. The hub 112 is mounted rotatable with regard to the nacelle 122 by means of a main bearing (not shown). The hub 112 is rotatable about the rotational axis 110a. Each of the blades 10 extends radially with respect to the rotational axis 110a and has an airfoil section 20.

In between the hub 112 and each of the rotor blades 10, is provided a blade adjustment mechanism 116 in order to adjust the blade pitch angle of the blade 10 by rotating the respective blade 10 about a longitudinal axis (not shown) of the blade 10. The longitudinal axis of each of the blade 10 is aligned substantially parallel with the longitudinal extension of the respective blade 10. The blade adjustment mechanism 116 functions to adjust blade pitch angles of the respective blade 10.

The wind turbine 100 includes a main shaft 125 that rotatably couples the rotor 110, particularly the hub 112, to a generator 128 housed within the nacelle 122. The hub 112 is connected to a rotor of the generator 128. In an exemplary embodiment (not shown) of the wind turbine 100, the hub 112 is connected directly to the rotor of the generator 128, thus the wind turbine 100 is referred to as a gearless, direct drive wind turbine 100. As an alternative, as shown in the exemplary embodiment of FIG. 1, the wind turbine 100 includes a gear box 124 provided within the nacelle 122 and the main shaft 125 connects the hub 112 to the generator 128 via the gear box 124, thereby the wind turbine 100 is referred to as a geared wind turbine 100. The gear box 124 is used to convert the number of revolutions of the rotor 110 into a higher number of revolutions of the main shaft 125, and consequently of the rotor of the generator 128. Further, a brake 126 is provided in order to stop the operation of the wind turbine 100 or to reduce the rotational speed of the rotor 110 for instance in case of a very strong wind and/or in case of an emergency.

The wind turbine 100 further includes a control system 150 for operating the wind turbine 100 at desired operational parameters, for example at a desired yaw angle, with a desired blade pitch, at a desired rotational speed of the rotor 110, and so on and so forth. The controlling and/or adjusting of the operational parameters is performed to obtain an optimized power generation under the existent conditions for example under existent wind conditions and other weather conditions.

The wind turbine 100 may further include different sensors for example a rotational speed sensor 143, a power sensor 144, angle sensors 142, etc that provide inputs to the control mechanism 150 or other components of the wind turbine 100 to optimize operation of the wind turbine 100.

In the wind turbine 100, one or more of the blades 10 include one or more exhaust holes 3 and a cover plate 30 masking the exhaust holes 3. The exhaust holes 3 and the cover plate 30 are explained in further details later, particularly with reference to FIGS. 4 to 8.

As aforementioned, in the wind turbine 10, hot-air is used for de-icing and/or anti-icing. FIG. 2 in combination with FIG. 1 shows flow of hot-air 5 within the nacelle 122 and the hub 112 and subsequently into one or more of the blades 10. The hot-air 5 may be generated by a heat generating device 128 for example the generator 128 positioned inside the nacelle 122. The hot-air 5 may be an exhaust from the generator 128. In FIG. 2, and in subsequent FIG. 3, a direction of flow of the hot-air 5 within the nacelle 122 and the hub 112 is depicted with arrows marked with reference numeral 7. The nacelle 122 has an air intake 127 which is cool air from the outside of the nacelle 122. The cool air then gets heated up by the heat generating device 128, for example an air heating element, or may be heated up by any other device in the nacelle 122 which is in turn being cooled by the cool air, for example by the generator 128. The cool air then turns into the hot-air 5, for example exhaust from the generator 128, and flows from the nacelle 122 into the hub 112. The hot-air 5 may flow through inner space of the nacelle 122 as shown by arrows marked with reference numeral 7 or may flow by alternate paths created by hoses, flow channels or pipes that are fitted inside or outside the nacelle 122 and bring the hot-air 5 from the generator 128 to the hub 112 as shown by arrows marked with reference numeral 7'. To facilitate the flow 7 of the hot-air 5 from the nacelle 122 to the hub 112, any potential leakage points for the hot-air 5 are closed or sealed, for example a bed frame 130 is closed to restrict or eliminate the flow 7 from entering the tower 120 instead of the hub 112. Once within the hub 112 the hot-air 5 flows into the blade 10, particularly into the airfoil section 20, and subsequently in FIGS. 3 to 8 and also in FIG. 1, a direction of flow of the hot-air 5 within the airfoil section 20 is depicted with arrows marked with reference numeral 8.

Figure 3:
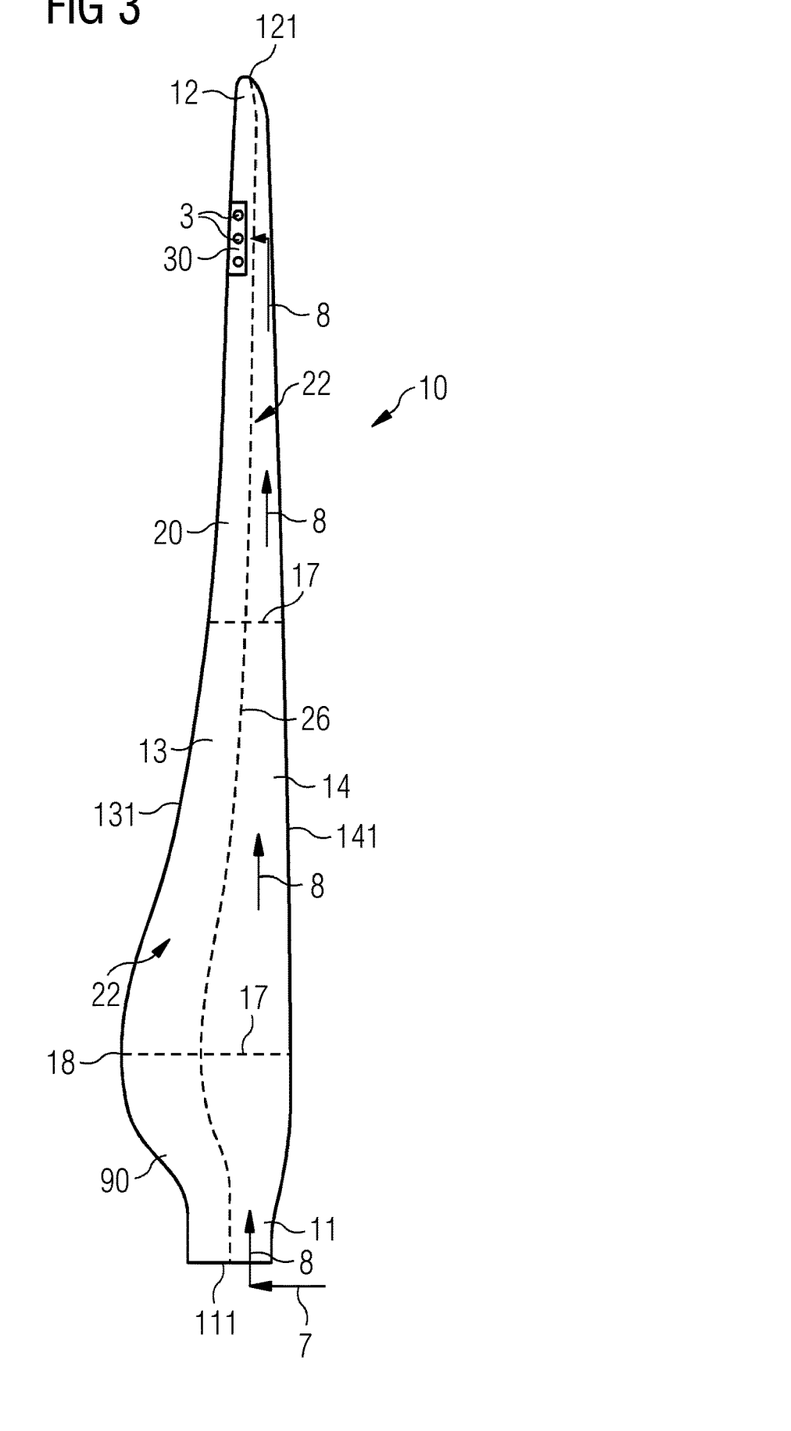
FIG. 3 schematically illustrates an exemplary embodiment of a wind turbine rotor blade of the wind turbine of FIGS. 1 and 2, and depicts a flow of hot-air within the rotor blade.

Hereinafter, FIG. 3 has been referred to explain the rotor blade 10 and the flow 8 of hot-air 5 within the airfoil section 20 of the rotor blade 10. FIG. 3 schematically shows one rotor blade 10 of the wind turbine 100 of FIG. 1. The rotor blade 10 includes a root section 11 having a root 111 and the airfoil section 20. Generally, the rotor blade 10 includes a transition section 90 in between the root section 11 and the airfoil section 20. The airfoil section 20, hereinafter also referred to as the airfoil 20, includes a tip section 12 having a tip 121. The root 111 and the tip 121 are separated by a span 16, of the rotor blade 10, which follows the shape of the rotor blade 10. A direction along or parallel to the span 16 is referred to as span-wise. The tip section 12, including the tip 121 therein, extends from the tip 121 towards the root 111 up to a span-wise position of approx 33.3% (percent), i.e. one third of the total length of the blade, as measured from the tip 121. The tip 121 extends within the tip section 12 towards the root 111 up to a span-wise position of approx. one meter. The rotor blade 10 includes a leading edge section 14 having a leading edge 141, and a trailing edge section 13 having a trailing edge 131. The trailing edge section 13 surrounds the trailing edge 131. Similarly, the leading edge section 14 surrounds the leading edge 141.

At each span-wise position perpendicular to the span 16, a chord line 17 that connects the leading edge 141 and the trailing edge 131 can be defined. A direction along or parallel to the chord line 17 is referred to as chord-wise. FIG. 3 depicts two such chord lines 17 at two different span-wise positions. The rotor blade 10 has a shoulder 18 that is a section of the rotor blade 10 where the chord line 17 has maximum chord length, i.e. in example of FIG. 3 at the chord line 17 that is depicted towards the root 111.

Figure 4:
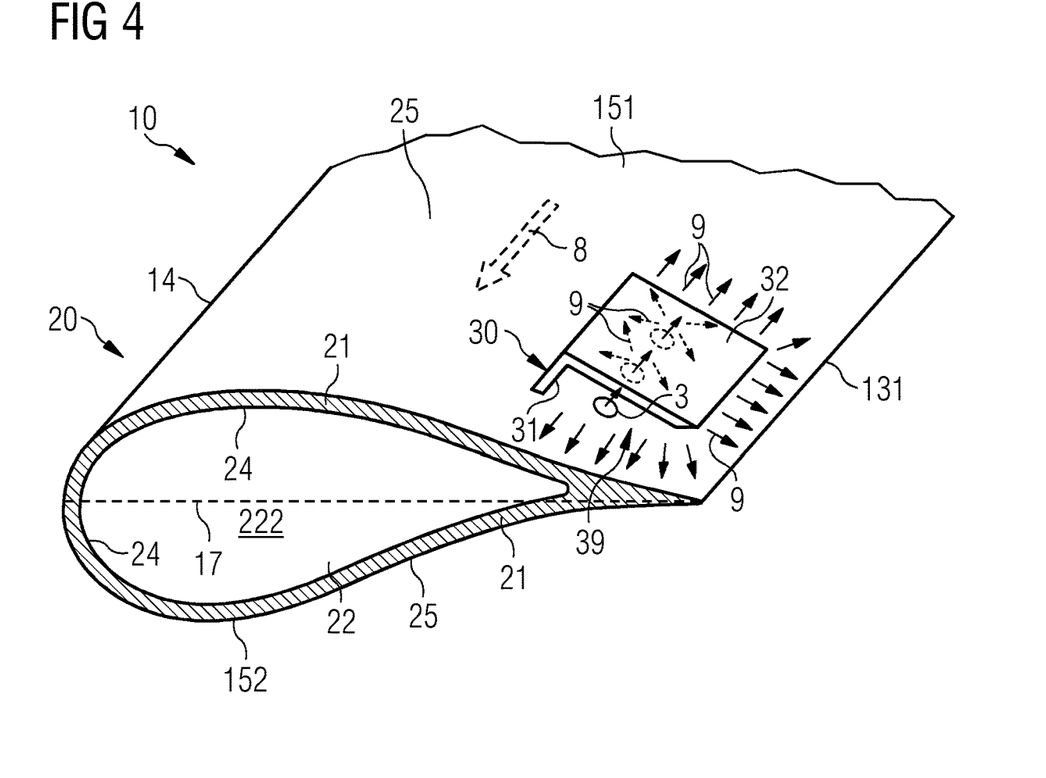
FIG. 4 schematically illustrates a perspective view of a cut section of the rotor blade of FIG. 3.
Figure 5:
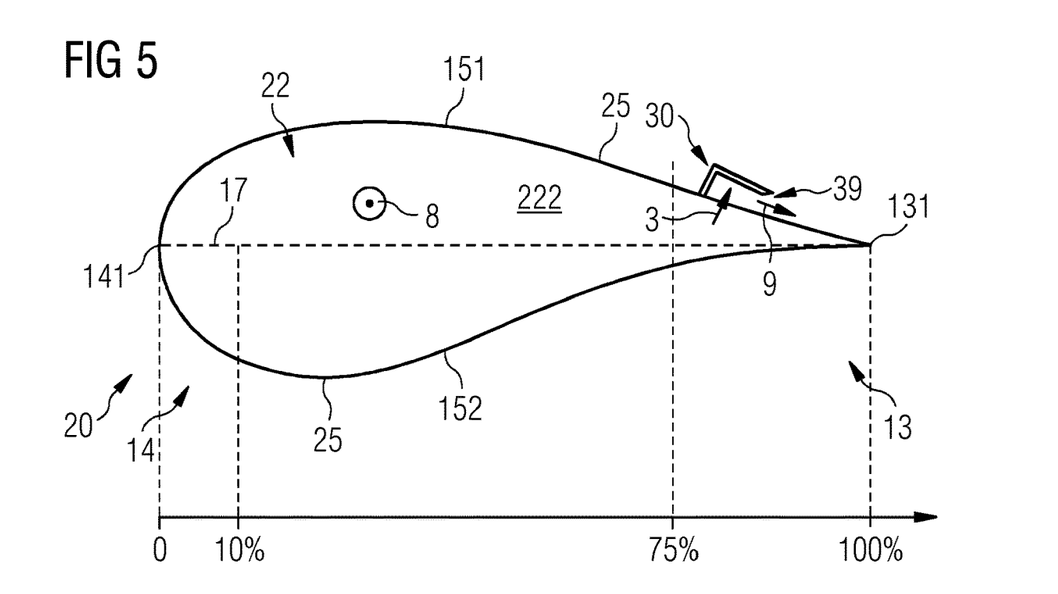
FIG. 5 schematically illustrates a cross-sectional view of the cut section of the rotor blade of FIG. 4.

FIGS. 4 and 5, hereinafter, in combination with FIG. 3, explain further details of the rotor blade 10. The lift generating profile i.e. the airfoil shape of the airfoil section 20 of the rotor blade 10 can be well distinguished in FIGS. 4 and 5. The rotor blade 10 has a body 21, generally referred to as a shell 21. The shell 21 or the body 21 of the airfoil 20 has an outer surface 25 having a suction side 151 and a pressure side 152, delimited by the leading edge 141 and the trailing edge 131. The leading edge 141 and the trailing edge 131 are connected by the chord line 17. The airfoil 20, particularly the body 21 of the airfoil 20, encompasses a cavity 22 of the airfoil 20. The cavity 22 is continuous with a cavity (not shown) inside the transition section 90 and the root section 11 of the rotor blade 10, or in other words the cavity 22 extends into the root section 11 and opens at the root 111 into the hub 112, thus the hot-air 5 flowing 8 from the nacelle 122 into the hub 112 further flows into the cavity 22. When the wind turbine 10 is operational, i.e. when the rotor blades 10 are rotating in the ambient air, the flow of the hot-air 5 from the hub 112 and into the root 111 of the rotor blade 10 and therefrom towards the tip 121 of the airfoil section 20 via the flow path 222 within the cavity 22 is facilitated by the centrifugal force generated due to the rotation of the rotor blades 10.

FIG. 5 also shows relative alignment of different sections of the airfoil section 20 of the rotor blade 10. The leading edge section 14, including the leading edge 141 therein, extends from the leading edge 141 towards the trailing edge 131 up to a chord-wise position of 10%, as measured from the leading edge 141. The trailing edge section 13, including the trailing edge 131 therein, extends from the trailing edge 131 towards the leading edge 141 up to a chord-wise position of 25%, as measured from the trailing edge 131.

As shown in FIGS. 1 to 5, the rotor blade 10 includes one or more exhaust holes 3, and at least one cover plate masking the exhaust holes 3. The exhaust holes 3 may be present in a local grouping, i.e. in vicinity to each other, to form a set of exhaust holes 3, and all the exhaust holes 3 of the set are covered by or masked by the cover plate 30. Although in FIGS. 1 to 5 only one such set of the exhaust holes 3 and one cover plate 30 covering the exhaust holes 3 is depicted, it may be appreciated by one skilled in the art that the rotor blade 10 according to the present technique may comprise more than one set of the exhaust holes 3, for example a first and a second set of the exhaust holes 3, and corresponding number of the cover plates 30, for example a first and a second cover plate 30. For example the first set of the exhaust holes 3 and the first cover plate 30 may be present on one location of the blade 10 for example on the pressure side 152 whereas the second set of the exhaust holes 3 and the second cover plate 30 may be present on another location of the blade 10 for example on the suction side 151.

As shown in FIGS. 4 and 5, a flow path 222 for the hot-air 5 is defined within the cavity 22. The flow path 222 may be the cavity 22 itself or may be flow channels (not shown) formed within the cavity 22. The flow path 222 at least partially extends within the cavity 22 of the airfoil section 20. Preferably, the flow path 222 extends in the root section 11 (shown in FIG. 3), the transition section 90 (shown in FIG. 3) and the airfoil section 20. The flow path 222 extends from the root section 11 towards the tip section 12. The flow path 222 receives the hot-air 5 from the root 111, as shown in FIG. 3, which, i.e. the hot-air 5, then flows into the airfoil section 20, particularly into the cavity 22, towards the tip 121.

As shown in FIGS. 1 to 5, one or more exhaust holes 3 are located at the outer surface 25 of the airfoil section 20. The one or more exhaust holes 3, hereinafter also referred to as the holes 3, are fluidly connected to the flow path 222 for the hot-air 5, i.e. fluid in form of the hot-air 5 can flow from the flow-path 222 inside the airfoil section 20 to an outside of the airfoil section 20 via the holes 3. The holes 3 emit the hot-air 5 from the airfoil section 20 i.e. the hot-air 5 exits the flow path 222 of the airfoil section 20 and flows to the outside of the airfoil section 20 via the holes 3.

As aforementioned, and as depicted in FIGS. 1 to 5, and particularly in FIGS. 4 and 5, the rotor blade 10 further includes at least one cover plate 30 positioned at the outer surface 25 of the airfoil section 20. The cover plate 20 may be formed of or fabricated from a suitable material for wind turbine applications for example, but not limited to, from thermoformed plastic and/or glassfibre material. The cover plate 20 masks or covers the holes 3 i.e. at least a part of the cover plate 30 hovers over or is suspended over the outer surface 25 of the airfoil section 20 such that a region of the outer surface 25 having the holes 3 is superimposed by the part of the cover plate 30. It may be noted that the cover plate 30 does not close or block or blind the holes 3, and instead the cover plate 30 is positioned such that an external flow space 39 is created between the holes 3 and an inner surface 31 of the cover plate 30.

The cover plate 30 inhibits the hot-air 5 exiting the holes 3 from flowing off or escaping from the airfoil section 20, particularly the outer surface 25, arbitrarily. The cover plate 30 directs the hot-air 5 after exiting the airfoil section 20 towards the outside of the rotor blade 20. The cover plate 20, particularly the inner surface 31 of the cover plate 20, functions to guide the hot-air 5 over the outer surface 25 of the airfoil section 20 after the hot-air 5 exits the airfoil section 20 but before the hot-air 5 escapes the rotor blade 10. In other words, the cover plate 30 ensures that the hot-air 5 exiting the airfoil section 20, before leaving the rotor blade 10, spreads in the external flow space 39 and then exits the external flow space 39 in such a way that the hot-air 5 flows over a desired part of the airfoil's outer surface 25 in the vicinity of the holes 3. In FIGS. 4 to 7 arrows marked with reference numeral 9 depict flow of the hot-air 5 in the external flow space 39 and over the surface 25 of the airfoil section 20.

Figure 6:
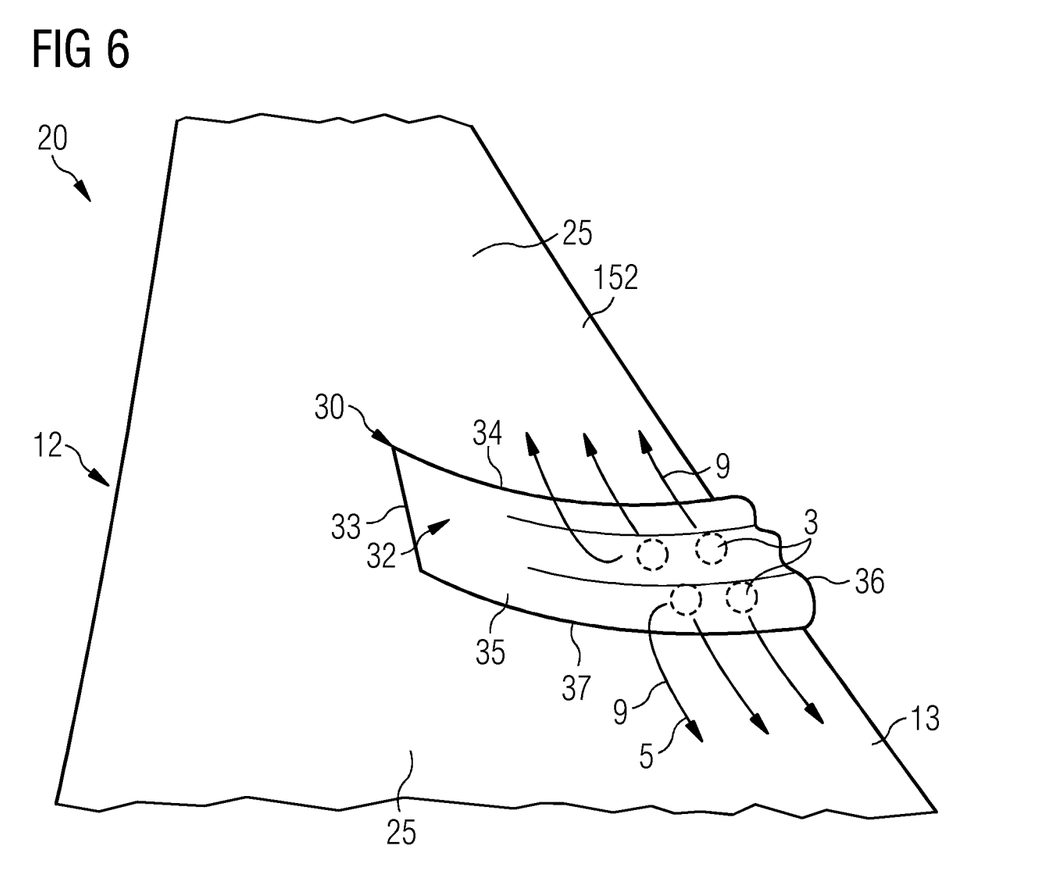
FIG. 6 schematically illustrates a perspective view of a part of another exemplary embodiment of the rotor blade of the wind turbine.
Figure 7:
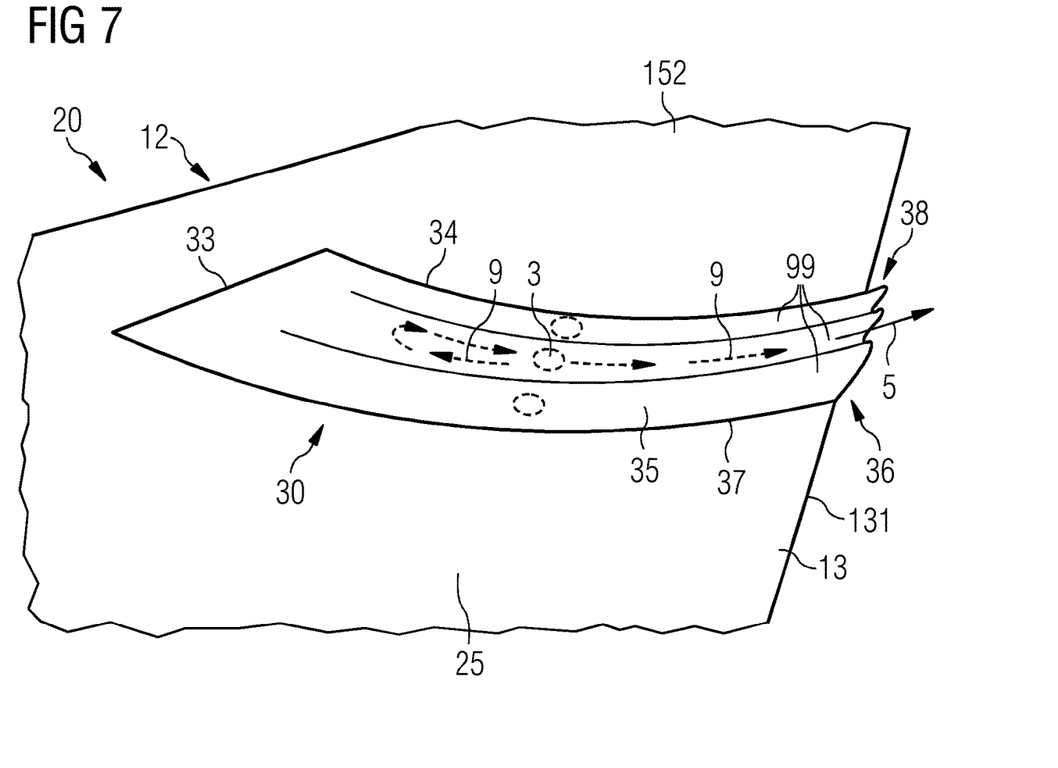
FIG. 7 schematically illustrates a perspective view of a part of another exemplary embodiment of the rotor blade of the wind turbine.

As shown in FIG. 6, a part of the cover plate 20, for example one or more edges 33,34,36,37 of the cover plate, is attached to the outer surface 25, whereas other part for example a middle section 35 of the cover plate 30 between the edges 33,34,36,37 is hovering over the holes 3. Thus, adjoining region of the outer surface 25 i.e. the region of the outer surface 25 in the vicinity of the holes 3 or surrounding the holes 3, is at partially enclosed forming the external flow space 39. The partially enclosed volume, i.e. the external flow space 39, may be enclosed by the cover plate 30 in such a way that the external flow space 39 is blocked in one or more directions whereas the external flow space 39 is free or open in one or more other directions, thereby dictating a path for flow 9 of the hot-air 5 after the hot-air 5 exits the airfoil section 20 and before the hot-air 5 leaves the rotor blade 20. FIG. 6 shows an exemplary embodiment of the cover plate 30 which is attached to the outer surface 25 at the sides or edges 33 and 36, whereas the other parts i.e. the edges 34, 37 and the middle section 35 of the cover plate 30 are hovering over the outer surface 25, thus as a result the hot-air 5 flows out in the span-wise direction as shown in FIG. 6. Alternatively, FIG. 7 shows another exemplary embodiment of the cover plate 30 which is attached to the outer surface 25 at the sides or edges 33,34 and 37, whereas the other parts i.e. the edge 36 and the middle section 35 of the cover plate 30 are hovering over the outer surface 25, thus as a result the hot-air 5 flows out in the chord-wise direction as shown in FIG. 7 and exits at the edge 36 of the cover plate 30.

The cover plate 30 may be attached to the outer surface 25 by adhering or gluing or sticking at least a part, i.e. the attached parts of the cover plate 30, to the outer surface 25 of the airfoil section 20, for example by using an adhesive or glue. The attached parts of the cover plate 30 in the example of FIG. 6 are the edges 33 and 36 whereas the attached parts of the cover plate 30 in the example of FIG. 7 are the edges 33, 34 and 37.

As shown in FIGS. 4 and 5, in an embodiment of the rotor blade 10, the holes 3 and the cover plate 30 masking the holes 3 are located at the trailing edge section 13. Alternatively in another embodiment (not shown) of the rotor blade 10, the holes 3 and the cover plate 30 masking the holes are located at the leading edge section 14. In yet another embodiment of the rotor blade 10, the holes 3, i.e. a first set (not shown) of the holes 3, and the cover plate 30, i.e. a first cover plate (not shown), masking the holes 3 of the first set are located at the trailing edge section 13, whereas the holes 3, i.e. a second set (not shown) of the holes 3, and the cover plate 30, i.e. a second cover plate (not shown), masking the holes 3 of the second set are located at the leading edge section 14, thus the rotor blade 10 includes two cover plates 30 and two sets of the holes 3.

As shown in FIGS. 4 and 5, in an embodiment of the rotor blade 10, the holes 3 and the cover plate 30 masking the holes 3 are located at the suction side 151 of the airfoil section 20. Alternatively as shown in FIGS. 6 and 7, in another embodiment of the rotor blade 10, the holes 3 and the cover plate 30 masking the holes 3 are located at the pressure side 152 of the airfoil section 20. In yet another embodiment (not shown) of the rotor blade 10, the holes 3, i.e. a first set (not shown) of the holes 3, and the cover plate 30, i.e. a first cover plate (not shown), masking the holes 3 of the first set are located at the pressure side 152 of the airfoil section 20, whereas the holes 3, i.e. a second set (not shown) of the holes 3, and the cover plate 30, i.e. a second cover plate (not shown), masking the holes 3 of the second set are located at the suction side 151 of the airfoil section 20, thus the rotor blade 10 includes two cover plates 30 and two sets of the holes 3.

As shown in FIGS. 6 and 7, in an embodiment of the rotor blade 10, the holes 3 and the cover plate 30 masking the holes 3 are located at the tip section 12 of the airfoil section 20. As aforementioned, the tip section 12 includes the tip 121 of the airfoil section 20.

In another embodiment of the rotor blade 10, as shown in FIGS. 6 and 7, an outer surface 32 of the cover plate 30 is aerodynamically shaped i.e. the outer surface 32 of the cover plate 30 is shaped or contoured or formed according to a contour of a part of the outer surface 25 of the airfoil section 20 on which or over which the cover plate 20 is positioned. As shown in FIGS. 6 and 7, the cover plate 30, particularly the middle section 35 of the cover plate 30, and more particularly the outer surface 32 of the middle section 35 of the cover plate 30 is shaped according to shape of the pressure side 152 at the trailing edge section 13 of the airfoil section 20 of the rotor blade 10.

Figure 8:
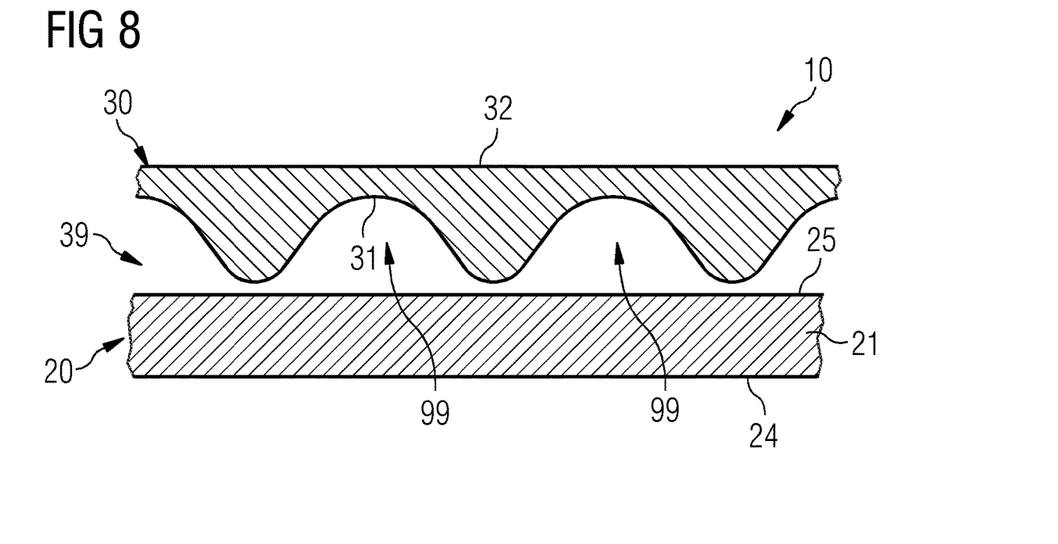
FIG. 8 schematically illustrates a cross-sectional view of a part of an exemplary embodiment of the rotor blade when viewed along a chord-wise direction.

Hereinafter referring to FIGS. 7 and 8, further exemplary embodiments of the rotor blade 10 of the present technique are explained. In an embodiment of the rotor blade 10, the inner surface 31 of the cover plate 30 is profiled or shaped, as seen particularly in FIG. 8, to define a plurality of distinct flow paths 99 within the external flow space 39. As seen in the example of FIGS. 7 and 8, the inner surface 31 of the cover plate 30 i.e. the surface of the cover plate 30 facing the outer surface 25 of the airfoil 20 has alternating projections and grooves formed to define the distinct flow paths 99 limited by the grooves and the outer surface 25 of the airfoil section 20. Each of the distinct flow paths 99 correspond to at least one of the holes 3 and guides the hot-air 5 exiting that hole 3 towards the outside of the rotor blade 10. As shown in FIG. 7, one distinct flow path 99 corresponds to the hole 3 in the middle of the three holes 3 depicted in FIG. 7 and guides the hot-air 5 exiting that hole 3 to the outside of the rotor blade 10.

As shown in FIG. 7, in yet another embodiment of the rotor blade 10, the cover plate 30 includes serrations 38 at an edge, i.e. the edge 36 in the example of FIG. 7, of the cover plate 30 positioned towards the trailing edge 131 of the airfoil section 20. The serrations 38 may be formed as one-part with the rest of the cover plate 30 or may be formed separately and then affixed to the cover plate 30.

While the present technique has been described in detail with reference to certain embodiments, it should be appreciated that the present technique is not limited to those precise embodiments. Rather, in view of the present disclosure which describes exemplary modes for practicing embodiments of the invention, many modifications and variations would present themselves, to those skilled in the art without departing from the scope and spirit of embodiments of this invention. The scope of embodiments of the invention are, therefore, indicated by the following claims rather than by the foregoing description. All changes, modifications, and variations coming within the meaning and range of equivalency of the claims are to be considered within their scope.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor blade for a wind turbine using hot-air for preventing and/or eliminating ice accretion on the rotor blade, the rotor blade comprising:
    a root section;
    an airfoil section, the airfoil section comprising a cavity and having a leading edge section, a trailing edge section, a pressure side, a suction side, and a tip section,
    a flow path for the hot-air, wherein the flow path at least partially extends within the cavity of the airfoil section and extends from the root section towards the tip section, and wherein the flow path is configured to receive the hot-air,
    one or more exhaust holes located at an outer surface of the airfoil section and fluidly connected to the flow path for the hot-air, wherein the one or more exhaust holes are configured to emit the hot-air to exit the airfoil section, and
    at least one cover plate positioned at the outer surface of the airfoil section and masking the one or more exhaust holes, wherein an external flow space is created between the one or more exhaust holes and an inner surface of the cover plate such that the hot-air exiting the airfoil section is directed by the cover plate towards an outside of the rotor blade;
    wherein the cover plate comprises a thermoformed plastic and/or glassfibre material.

2. The rotor blade according to claim 1, wherein the one or more exhaust holes and the cover plate masking the one or more exhaust holes are located at the trailing edge section.

3. The rotor blade according to claim 1, wherein the one or more exhaust holes and the cover plate masking the one or more exhaust holes are located at the leading edge section.

4. The rotor blade according to claim 1, wherein the one or more exhaust holes and the cover plate masking the one or more exhaust holes are located on the pressure side of the airfoil section.

5. The rotor blade according to claim 1, wherein the one or more exhaust holes and the cover plate masking the one or more exhaust holes are located on the suction side of the airfoil section.

6. The rotor blade according to claim 1, wherein the one or more exhaust holes and the cover plate masking the one or more exhaust holes are located at the tip section.

7. The rotor blade according to claim 1, wherein the inner surface of the cover plate is profiled to define a plurality of distinct flow paths within the external flow space and wherein at least one of the distinct flow paths guides the hot-air exiting one of the one or more exhaust holes towards the outside of the rotor blade.

8. The rotor blade according to claim 1, wherein the cover plate is configured to direct the hot-air substantially chord-wise and/or substantially span-wise towards the outside of the rotor blade.

9. The rotor blade according to claim 1, wherein the cover plate comprises a thermoformed plastic and/or glassfibre material.

10. The rotor blade according to claim 1, wherein at least a part of the cover plate is adhered to the outer surface of the airfoil section.

11. The rotor blade according to claim 1, wherein the cover plate comprises serrations at an edge of the cover plate positioned towards a trailing edge of the airfoil section.

12. A wind turbine comprising:
    one or more rotor blades connected to a hub, wherein the rotor blades are according to claim 1, a nacelle connected to the hub, a heat generating device housed within the nacelle, and a main flow path defined within the nacelle and the hub, and fluidly connected to the flow path of the airfoil section such that heat from the heat generating device in form of hot-air is directed from the nacelle via the main flow path into the flow path of the airfoil section.

13. The wind turbine according to claim 12, wherein the heat generating device is a generator and wherein the heat from the heat generating device is an exhaust heat from the generator.

14. A rotor blade for a wind turbine using hot-air for preventing and/or eliminating ice accretion on the rotor blade, the rotor blade comprising:
    a root section;
    an airfoil section, the airfoil section comprising a cavity and having a leading edge section, a trailing edge section, a pressure side, a suction side, and a tip section,
    a flow path for the hot-air, wherein the flow path at least partially extends within the cavity of the airfoil section and extends from the root section towards the tip section, and wherein the flow path is configured to receive the hot-air,
    one or more exhaust holes located at an outer surface of the airfoil section and fluidly connected to the flow path for the hot-air, wherein the one or more exhaust holes are configured to emit the hot-air to exit the airfoil section, and
    at least one cover plate positioned at the outer surface of the airfoil section and masking the one or more exhaust holes, wherein an external flow space is created between the one or more exhaust holes and an inner surface of the cover plate such that the hot-air exiting the airfoil section is directed by the cover plate towards an outside of the rotor blade;
    wherein the cover plate comprises serrations at an edge of the cover plate positioned towards a trailing edge of the airfoil section.

15. The rotor blade according to claim 14, wherein the one or more exhaust holes and the cover plate masking the one or more exhaust holes are located at at least one of: the trailing edge section, the leading edge section, the pressure side of the airfoil section, and the tip section.

16. The rotor blade according to claim 14, wherein the one or more exhaust holes and the cover plate masking the one or more exhaust holes are located on the suction side of the airfoil section.

17. The rotor blade according to claim 14, wherein the inner surface of the cover plate is profiled to define a plurality of distinct flow paths within the external flow space and wherein at least one of the distinct flow paths guides the hot-air exiting one of the one or more exhaust holes towards the outside of the rotor blade.

18. The rotor blade according to claim 14, wherein the cover plate is configured to direct the hot-air substantially chord-wise and/or substantially span-wise towards the outside of the rotor blade.

19. The rotor blade according to claim 14, wherein the cover plate comprises a thermoformed plastic and/or glass-fibre material and at least a part of the cover plate is adhered to the outer surface of the airfoil section.

* * * * *